United States Patent
Horie et al.

(10) Patent No.: US 12,470,820 B2
(45) Date of Patent: Nov. 11, 2025

(54) IMAGE CAPTURING SYSTEM, CONTROL METHOD, AND STORAGE MEDIUM STORING CONTROL PROGRAM THEREFOR

(71) Applicant: CANON KABUSHIKI KAISHA, Tokyo (JP)

(72) Inventors: Nobuyuki Horie, Tokyo (JP); Katsuya Nakano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 18/736,982

(22) Filed: Jun. 7, 2024

(65) Prior Publication Data

US 2024/0422436 A1 Dec. 19, 2024

(30) Foreign Application Priority Data

Jun. 19, 2023 (JP) .................. 2023-100020

(51) Int. Cl.
*H04N 23/68* (2023.01)
*H04N 23/90* (2023.01)

(52) U.S. Cl.
CPC .......... *H04N 23/683* (2023.01); *H04N 23/90* (2023.01)

(58) Field of Classification Search
CPC .... H04N 23/683; H04N 23/90; H04N 23/665; H04N 23/66; G09G 5/10; G08G 1/165; G06N 3/096
See application file for complete search history.

(56) References Cited

U.S. PATENT DOCUMENTS

| | | | |
|---|---|---|---|
| 2017/0223252 A1* | 8/2017 | Tanaka | H04N 23/66 |
| 2020/0213525 A1* | 7/2020 | Inakura | H04N 23/665 |
| 2022/0237920 A1* | 7/2022 | Hamano | G08G 1/165 |
| 2023/0343064 A1* | 10/2023 | Matsuno | G09G 5/10 |
| 2024/0414675 A1* | 12/2024 | Costa-Requena | H04L 41/0823 |
| 2025/0061340 A1* | 2/2025 | Turuvekere Sreenivas | G06N 3/096 |

FOREIGN PATENT DOCUMENTS

JP 2009296323 A 12/2009

* cited by examiner

*Primary Examiner* — Hung H Lam
(74) *Attorney, Agent, or Firm* — Cowan, Liebowitz & Latman, P.C.

(57) ABSTRACT

An image capturing system capable of reducing processing load in an image process. The image capturing system includes image capturing apparatuses capable of image capturing and communicable mutually. A time synchronous unit synchronizes times of the image capturing apparatuses. A controller controls image capturing timings of the image capturing apparatuses based on the times synchronized by the time synchronous unit. An image processing unit applies an image process to images captured by the image capturing apparatuses at the image capturing timings controlled by the controller with using a learned model. A decision unit decides the learned model used in the image processing unit based on synchronous accuracies of times synchronized by the time synchronous unit.

18 Claims, 10 Drawing Sheets

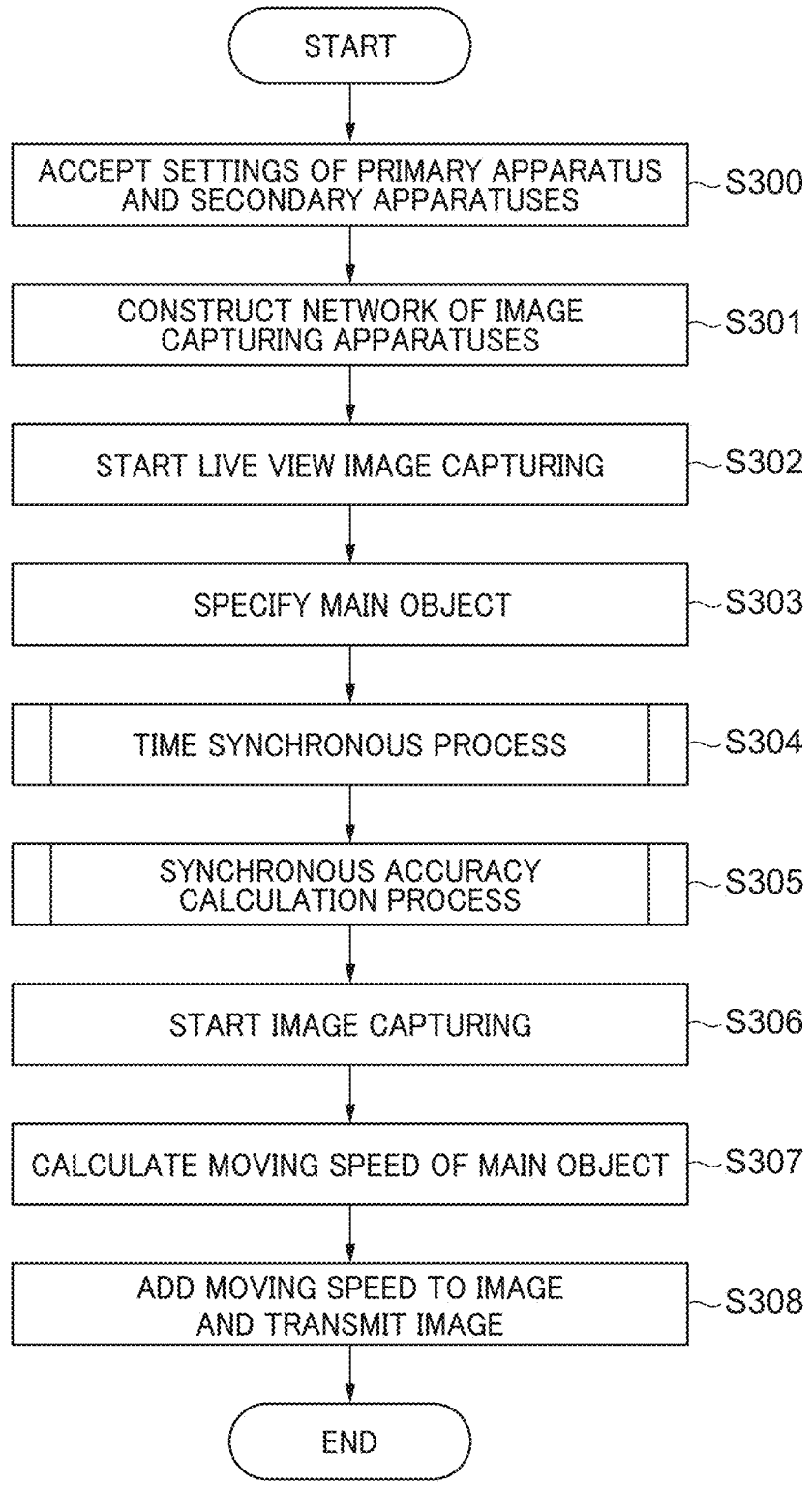

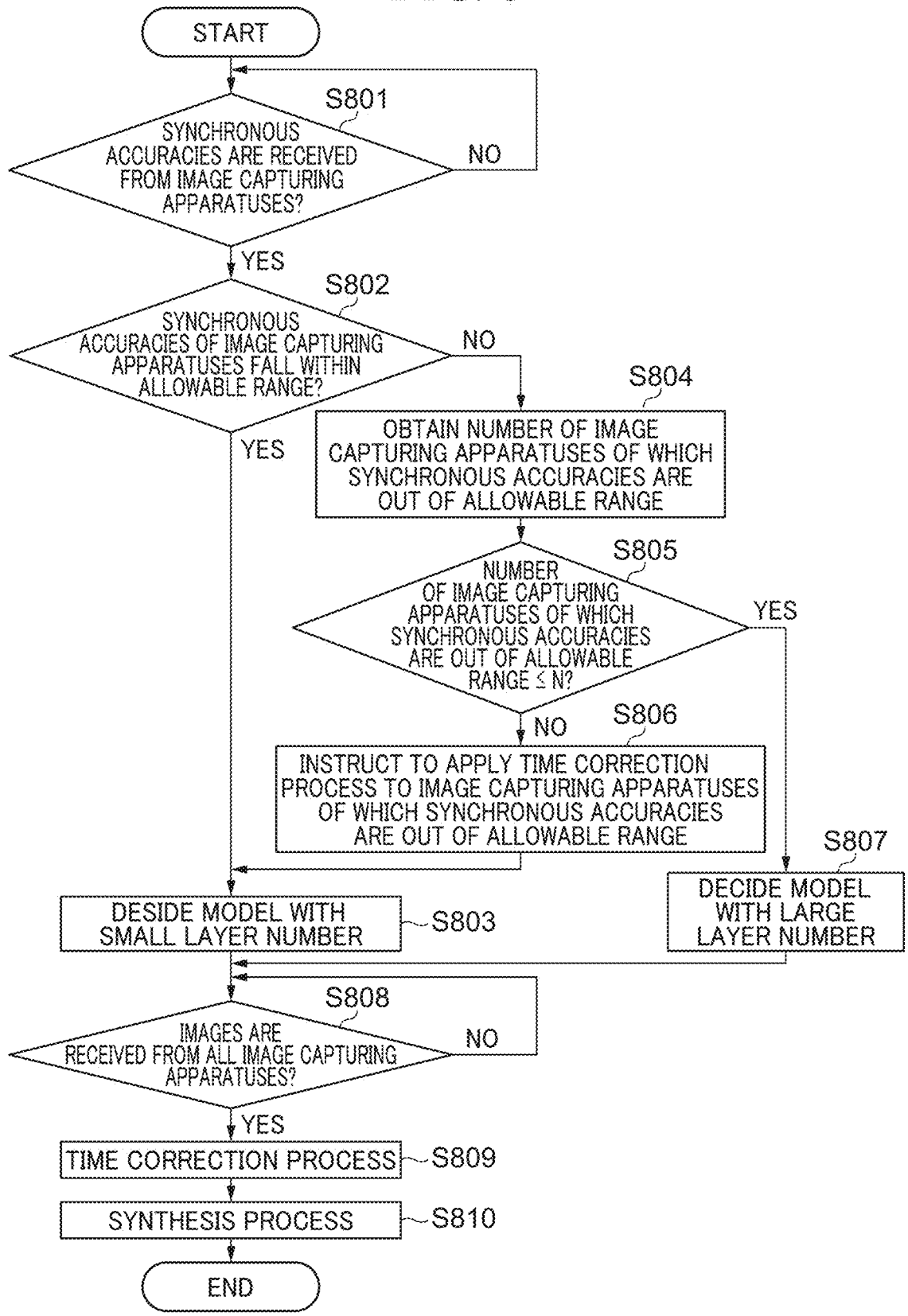

IMAGE CAPTURING SYSTEM, CONTROL METHOD, AND STORAGE MEDIUM STORING CONTROL PROGRAM THEREFOR

BACKGROUND OF THE INVENTION

Field of the Invention

The present invention relates to an image capturing system, a control method therefor, and a storage medium storing a control program therefor.

Description of the Related Art

There is a known image capturing system that includes a plurality of image capturing apparatuses capable of image capturing and enables mutual communications between the image capturing apparatuses. The image capturing system simultaneously performs image capturing by the respective image capturing apparatuses at a predetermined time while synchronizing the times of the image capturing apparatuses. Then, the image capturing system generates a three dimensional image by performing a synthesis process or the like of synthesizing images captured by the respective image capturing apparatuses. In the image capturing system, for example, an error occurs in the times synchronized between the image capturing apparatuses due to a variation in a processing time in the respective image capturing apparatuses, a variation in a communication time between the image capturing apparatuses. Depending on the degree of the error, a deviation may occur between the image capturing timings in the image capturing apparatuses. The deviation deteriorates an image quality of the three dimensional image obtained by synthesizing the images captured by the respective image capturing apparatuses. For example, Japanese Patent Laid-Open Publication No. 2009-296323 discloses an image capturing system in which a main image capturing apparatus measures a delay time of an auxiliary image capturing apparatus during communications in advance and image capturing timings of both the apparatuses are adjusted based on the measured delay time.

However, the image capturing system described in the above-mentioned publication cannot accurately synchronize the times of the image capturing apparatuses, for example, in a case where the processing time is not constant due to an individual difference of the image capturing apparatuses, or in a case where the delay time is not constant as in communication via a network. As a result, the image capturing timings may not be matched, and the image quality of the three dimensional image obtained by synthesizing the images captured by the image capturing apparatuses may be degraded. It is preferable to prevent the image quality deterioration. However, the prevention causes a problem that processing load in the image synthesis process increases.

SUMMARY OF THE INVENTION

The present invention provides an image capturing system, a control method therefor, and a storage medium storing a control program therefor, which are capable of reducing processing load in an image process.

Accordingly, an aspect of the present invention provides an image capturing system including image capturing apparatuses capable of image capturing and communicable mutually, a time synchronous unit configured to synchronize times of the image capturing apparatuses, a controller configured to control image capturing timings of the image capturing apparatuses based on the times synchronized by the time synchronous unit, an image processing unit configured to apply an image process to images captured by the image capturing apparatuses at the image capturing timings controlled by the controller with using a learned model, and a decision unit configured to decide the learned model used in the image processing unit based on synchronous accuracies of times synchronized by the time synchronous unit.

According to the present invention, the processing load in the image process is reduced.

Further features of the present invention will become apparent from the following description of exemplary embodiments with reference to the attached drawings.

BRIEF DESCRIPTION OF THE DRAWINGS

FIG. 3 is a flowchart showing a series of processes until image capturing apparatuses capture images in synchronization with each other.

FIG. 8 is a flowchart showing a series of processes until a server of an image capturing system according to a second embodiment synthesizes images from respective image capturing apparatuses.

DESCRIPTION OF THE EMBODIMENTS

Figure 1:
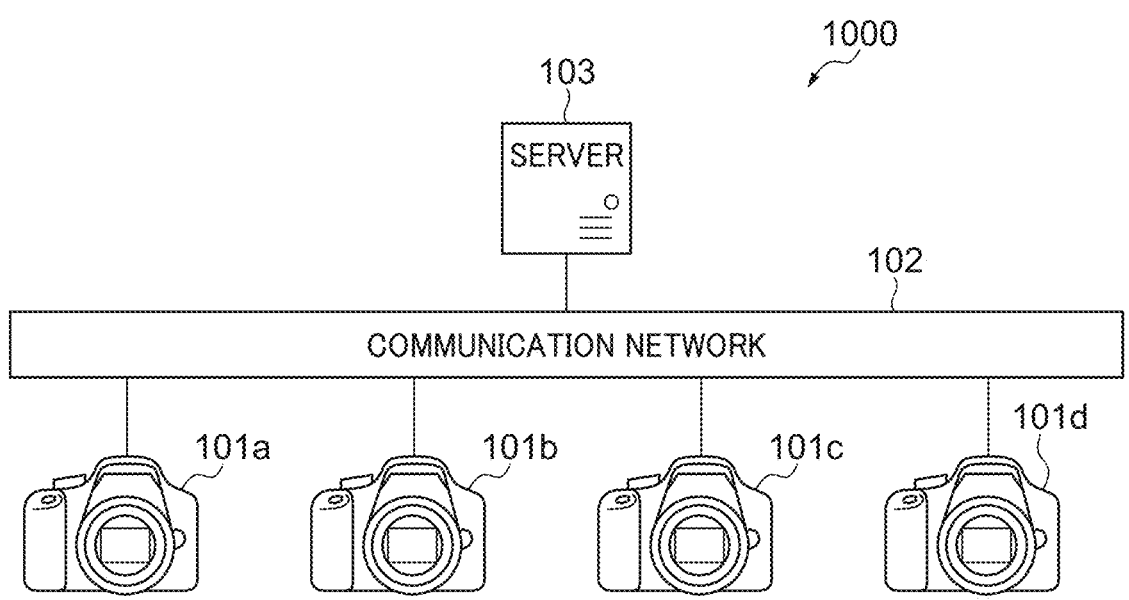
FIG. 1 is a view showing an example of an entire configuration of an image capturing system according to a first embodiment.

Hereafter, embodiments according to the present invention will be described in detail by referring to the drawings. However, configurations described in the following embodiments are merely examples, and the scope of the present invention is not limited by the configurations described in the embodiments. For example, each unit constituting the present invention can be replaced with any configuration capable of exhibiting the same function. In addition, an arbitrary constituent may be added. In addition, two or more arbitrary configurations (features) of the embodiments may be combined.

Hereinafter, a first embodiment will be described with reference to FIG. 1 to FIG. 7. FIG. 1 is a view showing an example of an entire configuration of an image capturing system 1000 according to the first embodiment. As shown in FIG. 1, the image capturing system 1000 includes four image capturing apparatuses 101a, 101b, 101c, and 101d that can capture images, and a server 103. The image capturing apparatuses 101a to 101d are communicably connected to each other via a communication network 102, such as a LAN or the Internet. Each of the image capturing apparatuses 101a to 101d and the server 103 are also communicably connected to each other via the communication network 102. The images captured by the respective image capturing apparatuses 101a to 101d are transmitted to the server 103. Accordingly, the server 103 can receive the images from the respective image capturing apparatuses 101a to 101d. The server 103 can create a three dimensional image by synthesizing the images.

Thus, in this embodiment, the server 103 has a function as an image processing unit to perform a process of creating a three dimensional image. The image capturing apparatuses 101a to 101d are digital cameras in the configuration shown in FIG. 1, but are not limited thereto, and may be, for example, tablet terminals, smartphones, or the like having an image capturing function. Although the image capturing system 1000 shown in FIG. 1 includes the four image capturing apparatuses, the number of image capturing apparatuses arranged in the image capturing system 1000 is not limited thereto and may be, for example, two, three, five or more.

Figure 2:
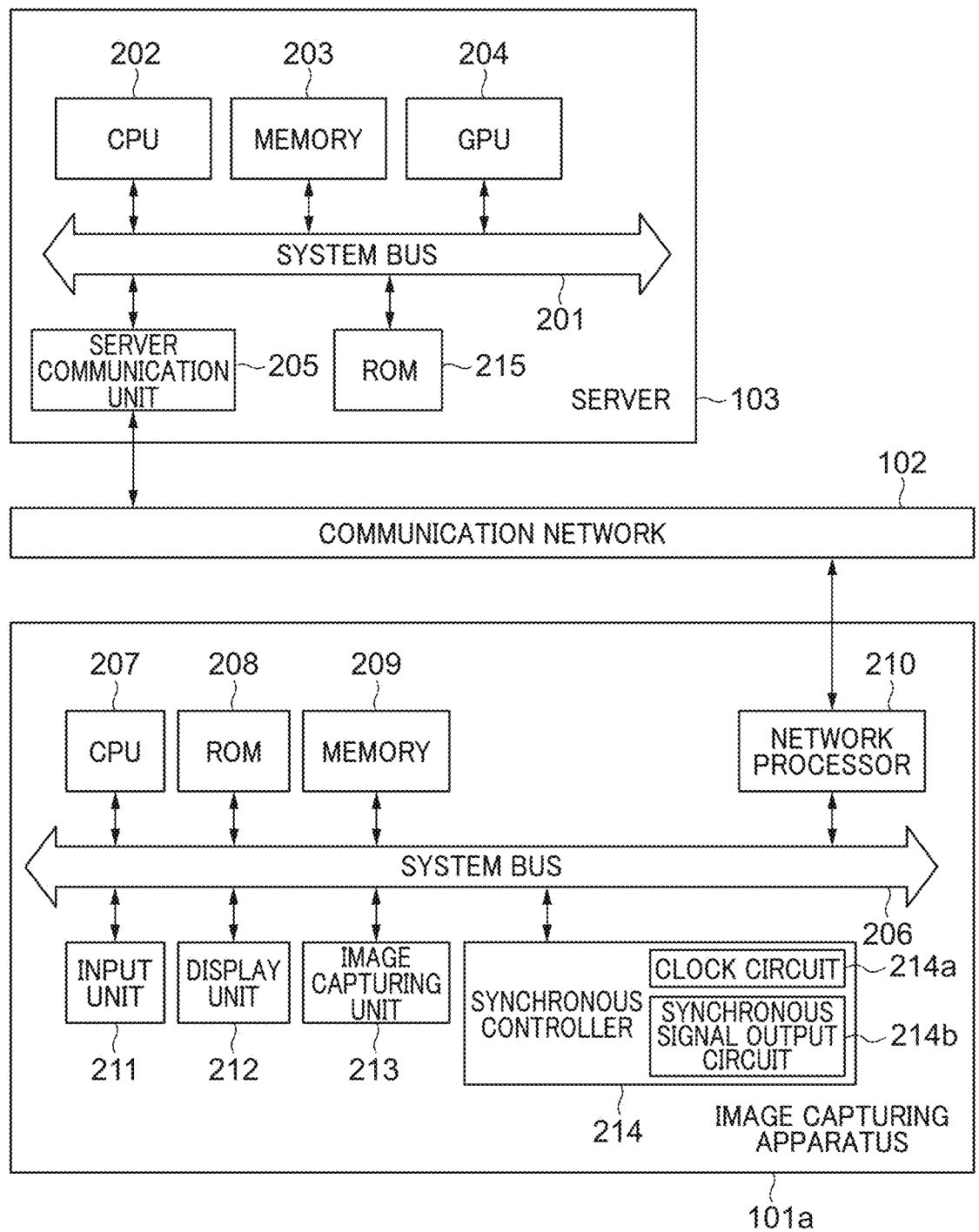
FIG. 2 is a block diagram showing an example of a hardware configuration of the image capturing system shown in FIG. 1.

FIG. 2 is a block diagram showing an example of a hardware configuration of the image capturing system shown in FIG. 1. Although FIG. 2 shows the image capturing apparatus 101a as a representative of the image capturing apparatuses 101a to 101d, the other image capturing apparatuses 101b to 101d have the same configuration. As shown in FIG. 2, the image capturing apparatus 101a includes a CPU (controller) 207, a ROM 208, a memory 209, a network processor 210, an input unit 211, a display unit 212, an image capturing unit 213, and a synchronous controller (time synchronous unit) 214. These components are communicably connected to each other via a system bus 206.

The CPU 207 controls operations of the ROM 208, memory 209, network processor 210, input unit 211, display unit 212, image capturing unit 213 and synchronous controller 214. Various programs and the like are stored in the ROM 208. The programs are not particularly limited and include a program for causing the CPU 207 (a computer) to execute each unit or each means (a control method of the image capturing system) of the image capturing system 1000, for example. Storage storing the various programs is not limited to the ROM 208 and a hard disk or the like may be employed, for example.

The memory 209 is constituted by a RAM, for example. The CPU 207 uses the memory 209 as a work memory in executing a program stored in the ROM 208. The input unit 211 can receive an input operation from a user who uses the image capturing apparatus 101a. The input unit 211 is not particularly limited, and is constituted by, for example, mechanical operation buttons, a touch panel, or the like.

The input unit 211 can also generate and transmit control signals to the CPU 207 in response to input operations. Thus, the CPU 207 can control the network processor 210, display unit 212, image capturing unit 213, and synchronous controller 214 in accordance with a program activated by a control signal from the input unit 211.

The display unit 212 is constituted by, for example, a display panel, and displays various images, such as images captured by the image capturing unit 213, in accordance with display signals input. In a case where a touch panel is used as the input unit 211, the input unit 211 can be integral with the display unit 212. In this case, for example, a touch panel having a light transmittance that allow a user to sufficiently visually recognize an image displayed on the display panel is attached to the surface of the display panel. Then, the input unit 211 and the display unit 212 can be integrally configured by associating the input coordinate on the touch panel with the display coordinates on the display panel.

The image capturing unit 213 captures an image, and includes, for example, a lens, a shutter having a diaphragm function, an image sensor that converts an optical image into an electric signal, and an image processor that performs various image processes, such as exposure control and ranging control, using the electric signal from the image sensor. The image sensor is not particularly limited, and examples thereof include a CCD sensor and a CMOS sensor. The user can instruct the image capturing unit 213 to capture an image through the input unit 211. The network processor 210 communicates with the server 103 via the communication network 102.

In the image capturing system 1000, one of the image capturing apparatuses 101a to 101d is set as a primary apparatus, that is, a main image capturing apparatus, and the remaining image capturing apparatuses are set as secondary apparatuses, that is, auxiliary image capturing apparatuses. The primary apparatus manages a time serving as a reference in synchronizing the times of the image capturing apparatuses 101a to 101d. The secondary apparatus synchronizes its time in accordance with the time of the primary apparatus. Then, the times of the image capturing apparatuses 101a to 101d can be synchronized by adjusting the times of the secondary apparatuses to the time of the primary apparatus.

For example, in this embodiment, the image capturing apparatus 101a is used as the primary apparatus, and the image capturing apparatuses 101b to 101d are used as the secondary apparatuses. In the image capturing system 1000, another image capturing apparatus may be arranged as the primary apparatus separately from the image capturing apparatuses 101a to 101d, and the image capturing apparatus 101a to 101d may be used as the secondary apparatuses.

The synchronous controller 214 synchronizes the times of the image capturing apparatuses 101a to 101d by matching the times of the image capturing apparatuses (secondary apparatuses) 101b to 101d to the time of the image capturing apparatus (primary apparatus) 101a (a time synchronous step).

The CPU 207 can control the image capturing timings in the respective image capturing apparatuses 101a to 101d on the basis of the time synchronized by the synchronous controller 214 (a control step). The synchronous controller 214 is constituted by a clock circuit 214a and a synchronous signal output circuit 214b.

The clock circuit 214a is used for synchronizing the own time with the times of the other image capturing apparatuses via the network processor 210. The synchronous signal output circuit 214b outputs a pulse signal for synchronization (a synchronous signal) from the clock circuit 214a to the image capturing unit 213 to adjust the image capturing timing.

The clock circuit 214a is a hardware counter and counts up at a predetermined timing to manage the time. The clock circuit 214a also has a function of correcting a counter value in order to synchronize the own time with the times of the other image capturing apparatuses via the network processor 210. The synchronous signal output circuit 214b outputs the pulse signal for synchronization from the clock circuit 214a to the image capturing unit 213. The image capturing unit 213 controls the image capturing timing in response to the synchronous signal as a trigger.

As shown in FIG. 2, the server 103 includes a CPU 202, a memory 203, a GPU (a Graphics Processing Unit) 204, a server communication unit 205, and a ROM (storage unit) 215. These components are communicably connected to each other via a system bus 201.

The CPU 202 controls operations of the memory 203, GPU 204, server communication unit 205, and ROM 215. Various programs and the like are stored in the ROM 215. The programs are not particularly limited and include a program for causing the CPU 202 (a computer) to execute each unit or each means (a control method of the image capturing system) of the image capturing system 1000, for example. Storage storing the various programs is not limited to the ROM 215 and a hard disk or the like may store the various programs, for example.

The server 103 receives the images captured by the respective image capturing apparatuses 101a to 101d in the image capturing timing described above. Then, the server 103 applies an image process to the images from the respective image capturing apparatuses 101a to 101d (an image processing step). The image process in this embodiment generates a three dimensional image by applying a synthesis process for synthesizing the images, but this is not limiting.

The memory 203 is constituted by, for example, a RAM, and is used as a work memory when the CPU 202 and the GPU 204 operate. The server communication unit 205 communicates with the image capturing apparatuses 101a to 101d via the communication network 102.

In this embodiment, the CPU 202 receives communication requests from the image capturing apparatuses 101a to 101d, and generates control signals corresponding to the communication requests. The CPU 202 also operates the GPU 204. The GPU 204 is a calculator capable of performing a process specialized for computer graphics computation.

The GPU 204 is able to process calculations required for a neural network 410 (see FIG. 4B), such as matrix operations, more quickly than the CPU 202. The GPU 204 can be in charge of a calculation process together with the CPU 202. The server 103 may include, for example, a TPU (Tensor Processing Unit) instead of the GPU 204. The server 103 may include a NPU (a neural network processing unit) that performs the calculation process together with the CPU 202.

FIG. 3 is a flowchart showing a series of processes until the image capturing apparatuses capture images in synchronization with each other. Although the program based on the flowchart shown in FIG. 3 is started by the user operating one image capturing apparatus from among the image capturing apparatuses 101a to 101d in this embodiment, this is not limiting. For example, the start of the program may be instructed by remote control.

As shown in FIG. 3, in a step S300, the CPU 207 accepts settings of the primary apparatus and the secondary apparatuses. As described above, the image capturing apparatus 101a is set as the primary apparatus and the remaining image capturing apparatuses 101b to 101d are set as the secondary apparatuses among the image capturing apparatuses 101a to 101d that are communicably connected to each other in this embodiment.

These settings can be accepted from operations to the touch panel (a set unit) of the input unit 211 integrally configured with the display panel of the display unit 212 on which a setting screen is displayed in the image capturing apparatus 101a. Then, the CPU 207 can receive the setting information on the setting screen, that is, the information that the image capturing apparatus 101a is set to the primary apparatus and the image capturing apparatuses 101b to 101d are set to the secondary apparatuses. This information is shared among the image capturing apparatuses 101a to 101d.

In a step S301, when the CPU 207 of the image capturing apparatus 101a, which is the primary apparatus, determines that the input unit 211 has received the instruction to start synchronous image capturing of the image capturing apparatuses 101a to 101d, the CPU 207 constructs a network among the image capturing apparatuses 101a to 101d. The "network construction" is to enable a communication process among the image capturing apparatuses 101a to 101d for the synchronous image capturing.

Specifically, the CPU 207 of the image capturing apparatus 101a controls the network processor 210 to communicate with the image capturing apparatuses 101b to 101d connected to the communication network 102. At this time, the CPU 207 of the image capturing apparatus 101a transmits a packet for inquiring presence of an image capturing apparatus capable of the synchronous image capturing to the communication network 102 and waits for a reply packet. Then, the CPU 207 of the image capturing apparatus 101a specifies the image capturing apparatus participating in the synchronized image capturing on the basis of the reply packet. In this embodiment, the image capturing apparatuses 101b to 101d, which are the secondary apparatuses, are specified.

In a step S302, the CPU 207 of the image capturing apparatus 101a performs live view image capturing by the image capturing unit 213 and performs live view display of an image obtained by the live view image capturing on the display unit 212. In addition, it is preferable that the live view display is performed in the image capturing apparatuses 101b to 101d by following the image capturing apparatus 101a.

In a step S303, the CPU207 of the image capturing apparatus 101a specifies a main object in the image being live view displayed. The main object is a moving object in this embodiment. In addition, the main object is specified, for example, by the user operating the input unit 211 to designate the object to be the main object in the image being live view displayed and the CPU 207 receiving the designation. Then, the CPU 207 of the image capturing apparatus 101a notifies the image capturing apparatuses 101b to 101d of the object information related to the specified object. Thus, the object information can be shared among the image capturing apparatuses 101a to 101d.

In a step S304, the CPU 207 of the image capturing apparatus 101a executes the time synchronous process for synchronizing the times among the image capturing apparatuses 101a to 101d. The time synchronous process in the step S304 will be described in detail later with reference to FIG. 5.

In a step S305, the CPU 207 of the image capturing apparatus 101a performs a synchronous accuracy calculation process to calculate a synchronous accuracy of the time synchronized in the step S304. The synchronous accuracy is related to a time deviation amount. In this way, the CPU 207 has a function as an accuracy detection unit that calculates (detects) the synchronous accuracy in this embodiment. The CPU 207 of the image capturing apparatus 101a controls the network processor 210 to transmit the synchronous accuracy, which is the result of the synchronous accuracy calculation process, to the server 103. The details of the synchronous accuracy calculation process in step S305 will be described later with reference to FIG. 7.

In a step S306, when determining that the input unit 211 has received the image capturing instruction from the user, the CPU 207 of the image capturing apparatus 101a controls the synchronous controller 214 to prepare for the image capturing in which the image capturing start time is set. In addition, along with the preparation for the image capturing, the CPU 207 of the image capturing apparatus 101a controls the network processor 210 to notify the image capturing apparatuses 101b to 101d of information about the image capturing timing. Then, when the image capturing start time comes, the CPU 207 of the image capturing apparatus 101a outputs the image capturing synchronous signal to the image capturing unit 213 and starts the image capturing by the image capturing unit 213.

Further, the image capturing apparatuses 101b to 101d also start the image capturing by following the image capturing apparatus 101a on the basis of the information about the image capturing timing. After starting the image capturing, when determining that the input unit 211 has received an image capturing end instruction from the user, the CPU 207 of the image capturing apparatus 101a ends the image capturing by controlling the image capturing unit 213 and the synchronous controller 214. In addition, the image capturing apparatuses 101b to 101d end the image capturing by following the image capturing apparatus 101a.

In a step S307, the CPU 207 of the image capturing apparatus 101a calculates a moving speed of the main object specified in the step S306 in the image captured in the step S303. Specifically, the CPU 207 of the image capturing apparatus 101a determines that a part on which the image capturing unit 213 is focused is the main object in the image captured in the step S306. Then, the CPU 207 calculates the moving speed of the object based on difference information between frames of the captured images. In this way, the CPU 207 functions as a speed detection unit that calculates (detects) the moving speed of the main object in this embodiment.

In a step S308, the CPU 207 of the image capturing apparatus 101a adds moving speed information regarding the moving speed of the main object calculated in the step S307 to the captured image stored in the memory 209. Then, the CPU 207 of the image capturing apparatus 101a transmits the captured image to which the moving speed information is added to the server 103 by controlling the network processor 210. In addition, the image capturing apparatuses 101b to 101d transmit the captured images to the server 103 by following the image capturing apparatus 101a. The steps S301 to S308 are preferably repeated.

The server 103 receives the captured images (synchronized captured images) from the image capturing apparatuses 101a to 101d. The server 103 applies the image process for generating a three dimensional image to these captured images. Although the server 103 executes the image process applied to the captured image in this embodiment, this is not limiting. One of the image capturing apparatuses 101a to 101d may executes the image process. For example, when the image capturing apparatus 101a executes the image process, the images captured by the image capturing apparatuses 101b to the 101d are transmitted to the image capturing apparatus 101a.

Figure 4A:
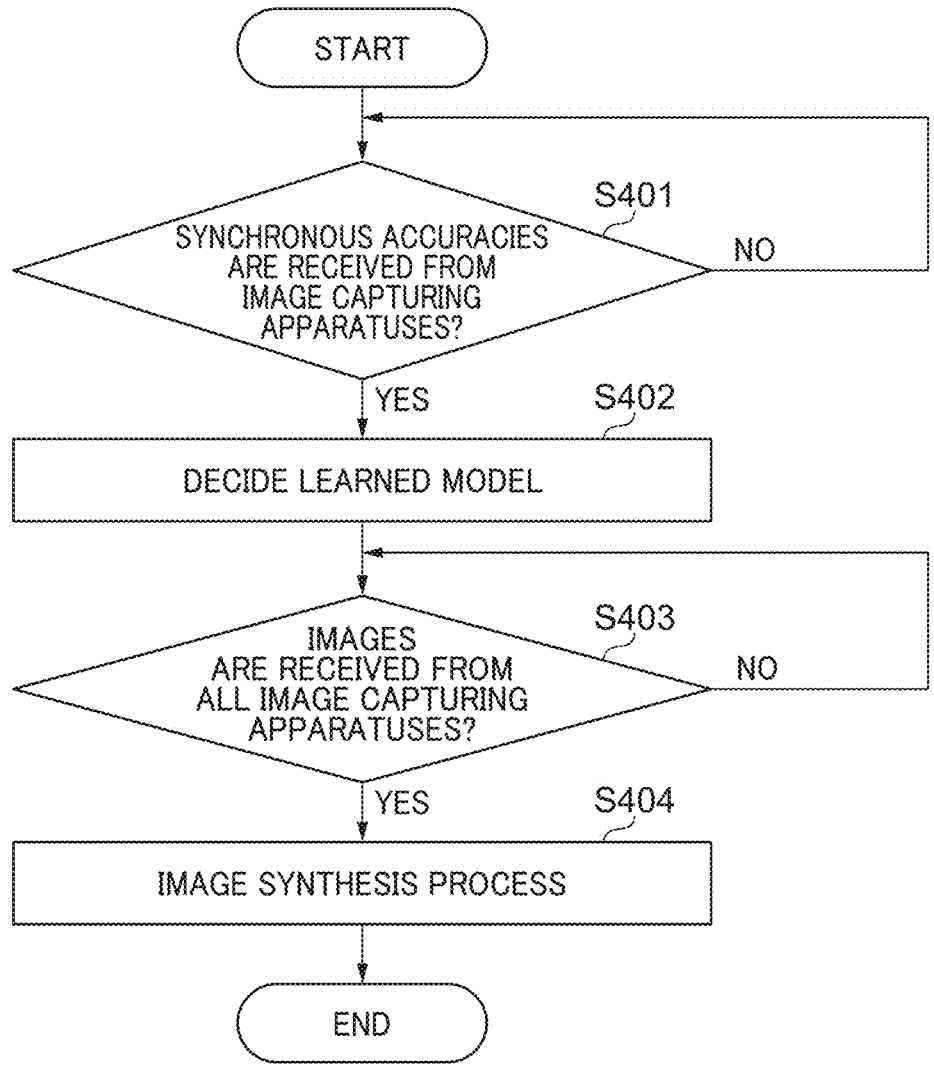
FIG. 4A is a flowchart showing a series of processes until a server synthesizes images from the respective image capturing apparatuses.
Figure 4B:
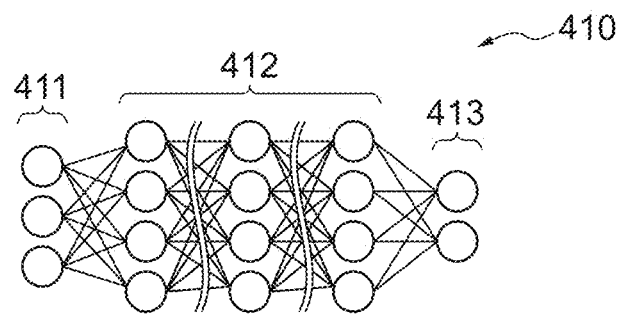
FIG. 4B is a view showing an example of a neural network.

FIG. 4A is a flowchart showing a series of processes until a server synthesizes images from the respective image capturing apparatuses. FIG. 4B is a view showing an example of a neural network. As shown in FIG. 4A, the CPU 202 of the server 103 determines in a step S401 whether the server communication unit 205 has received the synchronous accuracies transmitted in the step S305.

As a result of the determination in the step S401, when the CPU 202 determines that the synchronous accuracies are received, the process proceeds to a step S402. In the meantime, as a result of the determination in the step S401, when the CPU 202 determines that the synchronous accuracies are not received, the process waits in the step S401.

In the step S402 (a decision step), the CPU 202 decides a learned model to be used in a step S404 (an image synthesis process) on the basis of the synchronous accuracies received in the step S401. In this way, the CPU 202 has a function as a decision unit that decides a learned model in this embodiment. This omits providing a section having the function as the decision unit separately from the CPU 202, and thus the configuration of the server 103 is simplified. The server 103 may be provided with a section having the function as the decision unit separately from the CPU 202. The learned model includes, for example, a neural network 410 shown in FIG. 4B. The neural network 410 has an input layer 411, intermediate layers 412, and an output layer 413.

Incidentally, a state in which the synchronous accuracy is relatively low (i.e., the time deviation amount is relatively large) appears when the image capturing timings of the image capturing apparatuses 101a to 101d are deviated. In a case where an object moving at a high speed is captured by the respective image capturing apparatuses 101a to 101d in the state where the image capturing timings are deviated, the positions of the object in the captured images are deviated mutually. In addition, when a three dimensional image is generated by synthesizing all the images captured in the state where the positions of the object are deviated, the three dimensional image may be a blurred image. Therefore, in order to prevent or suppress the blur in the three dimensional image, when the image synthesis process is performed in the step S404, image correction using the neural network 410, that is, blur correction is performed.

The ROM 215 of the server 103 stores a plurality of neural networks. These neural networks are different from each other in at least one of quantities including the number of layers constituting the input, intermediate, and output layers and the total number of nodes included in all the layers.

The CPU 202 selects one neural network from among the stored neural networks corresponding to a blur correction amount. In particular, the CPU 202 selects a neural network with more the at least one of quantities including the number of layers and the total number of nodes and longer processing time as the blur correction amount is larger.

Also, the CPU 202 selects a neural network with the less the at least one of the quantities including the number of layers and the total number of nodes and shorter processing time as the blur correction amount is smaller. Further, the CPU 202 may select a neural network used in the step S404 on the basis of the synchronous accuracies and the moving speed of the object.

In a step S403, the CPU 202 determines whether the captured images from all the image capturing apparatuses 101a to 101d transmitted in the step S308 are received by the server communication unit 205. As a result of the determination in the step S403, when the CPU 202 determines that all the captured images are received, the process proceeds to the step S404. In the meantime, as a result of the determination in the step S403, when the CPU 202 determines that not all the captured images are received from the image capturing apparatuses 101a to 101d, the process waits in the step S403.

In the step S404, the GPU (an image process unit) 204 applies the image process to all the captured images received in the step S403 using the neural network 410 decided in the step S402, i.e., synthesizes all the captured images to generate a three dimensional image. As a result, the three dimensional image becomes an image in which the blur is corrected.

Specifically, all the captured images received in the step S403 are input to the input layer 411 of the neural network 410. Then, in the neural network 410, the image processes, such as the synthesis process and the blur correction process, are applied to all the captured images by the intermediate layers 412, and the three dimensional image in which a blur is corrected is output from the output layer 413. The steps S401 to S404 are preferably repeated.

As described above, in the image capturing system 1000, one neural network 410 suitable for the blur correction can be selected corresponding to the blur correction amount. This can reduce the processing load in the image processes in the neural network 410. In addition, the image quality deterioration due to a blur in the three dimensional image (synthetic image) generated from the synchronous image capturing is reduced.

It should be noted that learning in the learned model is supervised learning. As teacher data in the supervised learning, input images used when the learned model is trained and an output image obtained by processing the input images and in which a blur is prevented are prepared. In the learned model, a large number of learning operations for outputting a target output image on the basis of various input images are performed. In addition, as a machine learning algorithm, deep learning is preferable in this embodiment, but the machine learning algorithm is not limited thereto, and for example, a support vector machine, logistic regression, a decision tree, or the like may be used.

Figure 5:
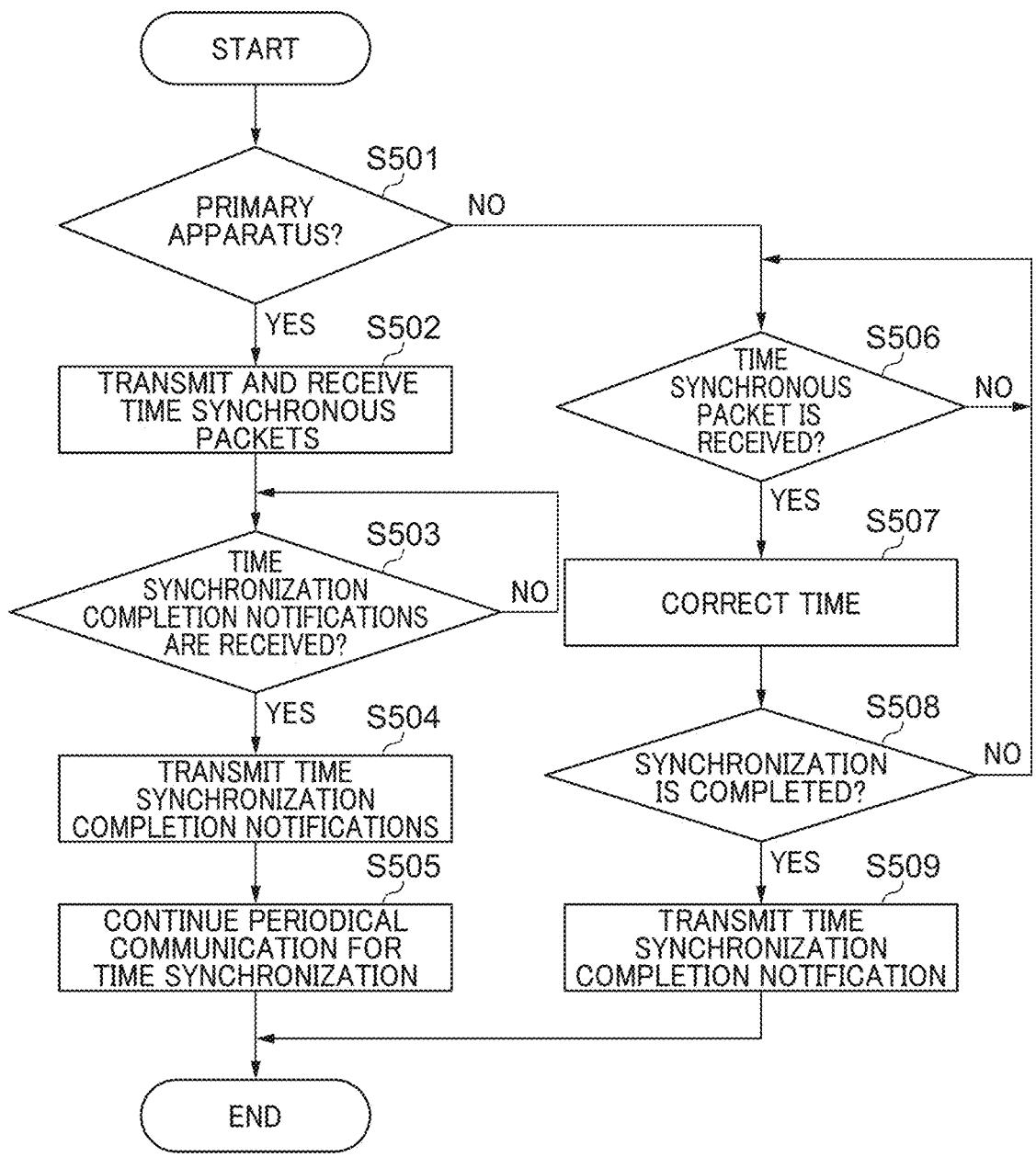
FIG. 5 is a flowchart showing a time synchronous process in a step S304 (subroutine) of the flowchart shown in FIG. 3.

FIG. 5 is a flowchart showing the time synchronous process in the step S304 (subroutine) of the flowchart shown in FIG. 3. The time synchronous process in FIG. 5 is executed by each of the image capturing apparatuses 101a to 101d. As shown in FIG. 5, in a step S501, the CPU 207 of each of the image capturing apparatuses 101a to 101d determines whether the image capturing apparatus itself is the primary apparatus. As a result of the determination in the step S501, when the CPU 207 determines that the image capturing apparatus itself is the primary apparatus, the process proceeds to a step S502. In the meantime, as a result of the determination in the step S501, when CPU 207 determines that the image capturing apparatus itself is not the primary apparatus, the process proceeds to a step S506.

As described above, in this embodiment, the image capturing apparatus 101a serves as the primary apparatus, and the image capturing apparatuses 101b to 101d serve as the secondary apparatuses. In this case, the CPU 207 of the image capturing apparatus 101a as the primary apparatus determines that the image capturing apparatus 101a itself is the primary apparatus in the step S501, and the process proceeds to the step S502. In addition, the CPU 207 of each of the image capturing apparatuses 101b to 101d as the secondary apparatuses determines that the image capturing apparatus itself is not the primary apparatus in the step S501, and the process proceeds to the step S506.

In the step S502, the CPU 207 of the image capturing apparatus 101a transmits and receives a time synchronous packet as information about time synchronization to and from the image capturing apparatuses 101b to 101d via the network processor 210. The details of the transmission and reception of the time synchronous packet will be described later with reference to FIG. 6.

In a step S503, the CPU 207 of the image capturing apparatus 101a determines whether time synchronization completion notifications are received from the image capturing apparatuses 101b to 101d via the network processor 210. As a result of the determination in the step S503, when the CPU 207 of the image capturing apparatus 101a determines that the time synchronization completion notifications are received, the process proceeds to a step S504. In the meantime, as a result of the determination in the step S503, when the CPU 207 of the image capturing apparatus 101a determines that not all the time synchronization completion notifications are received, the process waits in the step S503.

In the step S504, the CPU 207 of the image capturing apparatus 101a transmits notifications indicating the time synchronization completion in the image capturing system 1000 including the image capturing apparatuses 101a to 101d to the image capturing apparatuses 101b to the 101d via the network processor 210.

In a step S505, the CPU 207 of the image capturing apparatus 101a continues to periodically perform the process to communicate with the image capturing apparatuses 101b to 101d for the time synchronization.

In the step S506, the CPU 207 of each of the image capturing apparatuses 101b to 101d as the secondary apparatuses determines whether the time synchronous packet from the image capturing apparatus 101a is received via the network processor 210. As a result of the determination in the step S506, when the CPU 207 of each of the image capturing apparatuses 101b to 101d determines that the time synchronous packet is received, the process proceeds to a step S507. In the meantime, as a result of the determination in the step S506, when the CPU 207 of each of the image capturing apparatuses 101b to 101d does not receive the time synchronization packet, the process waits in the step S506.

In the step S507, the CPU 207 of each of the image capturing apparatuses 101b to 101d controls the synchronous controller 214 on the basis of the time synchronous packet received in the step S506 to correct the time of the clock circuit 214a.

The CPU 207 of each of the image capturing apparatuses 101b to 101d continues the time correction of the clock circuit 214a on the based on the communication for time synchronization periodically transmitted from the image capturing apparatus 101a. Then, the CPU 207 of each of the image capturing apparatuses 101b to 101d determines in a step S508 whether the synchronization is completed. This determination is made on the basis of whether a width of the correction values in a predetermined time period falls within a certain range. Then, when the width of the correction values in the predetermined time period falls within the certain range, the CPU 207 of each of the image capturing apparatuses 101b to 101d determines that the synchronization is completed and the process proceeds to a step S509. In the meantime, when the width of the correction values in the predetermined time period does not fall within the certain range, it is not determined that the synchronization is completed, and the process returns to the step S506.

In the step S509, the CPU 207 of each of the image capturing apparatuses 101*b* to 101*d* transmits a synchronous completion notification to image capturing apparatus 101*a* via the network processor 210. The steps S501 to S509 are preferably repeated.

Figure 6:
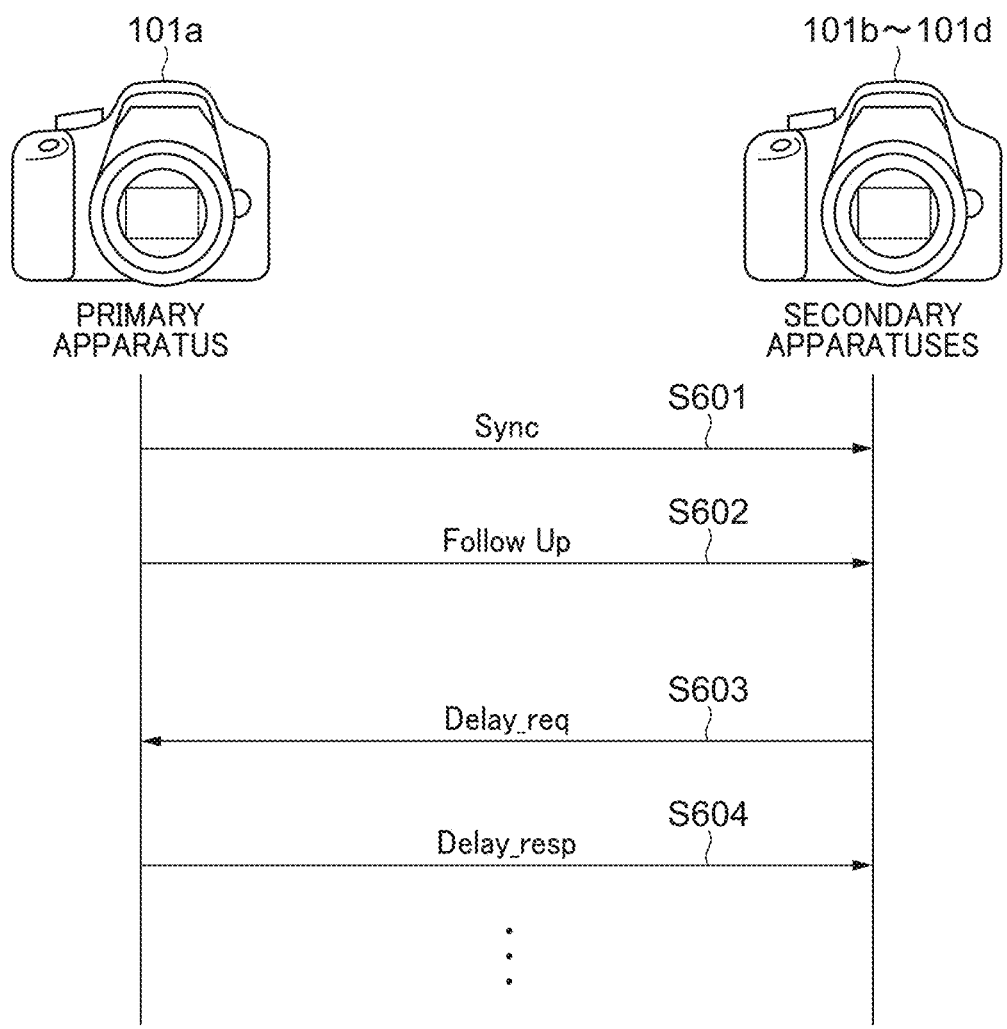
FIG. 6 is a sequence diagram showing a time synchronous packet transmission and reception process executed in a step S502 of the flowchart shown in FIG. 5.

FIG. 6 is a sequence diagram showing the time synchronous packet transmission and reception process executed in the step S502 of the flowchart shown in FIG. 5. In the image capturing system 1000, a delay time of the network path in the image capturing system 1000 is estimated by the time synchronous packet transmission and reception process, and the times of the image capturing apparatuses 101*b* to 101*d* are matched with the time of the image capturing apparatus 101*a* on the basis of the delay time.

Although the time synchronization packet transmission and reception process employs a two-step method in this embodiment, this is not limiting. For example, a one-step method may be employed. As shown in FIG. 6, in a step S601, the CPU 207 of the image capturing apparatus 101*a* as the primary apparatus transmits a Sync packet to each of the image capturing apparatuses 101*b* to 101*d* as the secondary apparatuses via the network processor 210. The Sync packet includes information indicating that the synchronous method is the two-step method. The CPU 207 of each of the image capturing apparatuses 101*b* to 101*d* receives the Sync packet from the image capturing apparatus 101*a* via the network processor 210. Then, the CPU 207 of each of the image capturing apparatuses 101*b* to 101*d* stores reception time of the Sync packet.

In a step S602, the CPU 207 of the image capturing apparatus 101*a* transmits a Follow Up packet to each of the image capturing apparatuses 101*b* to 101*d* via the network processor 210. The Follow Up packet includes transmission time of the SYNC packet transmitted in the step S601. The CPU 207 of each of the image capturing apparatuses 101*b* to 101*d* receives the Follow Up packet from the image capturing apparatus 101*a* via the network processor 210. The CPU 207 of each of the image capturing apparatuses 101*b* to 101*d* calculates the delay time in the communication path in the direction from the primary apparatus to the secondary apparatus on the basis of the difference between the SYNC packet transmission time included in the Follow Up packet and the reception time of the Sync packet.

In a step S603, the CPU 207 of each of the image capturing apparatuses 101*b* to 101*d* transmits a Delay_req packet (a delay-detection request packet) to the image capturing apparatus 101*a* via the network processor 210. At this time, the CPU 207 of each of the image capturing apparatuses 101*b* to 101*d* stores the transmission time of the Delay_req packet. The CPU 207 of the image capturing apparatus 101*a* receives the Delay_req packet from each of the image capturing apparatuses 101*b* to 101*d* via the network processor 210. Then, the CPU 207 of the image capturing apparatus 101*a* stores reception time in receiving the Delay_req packet.

In a step S604, the CPU 207 of the image capturing apparatus 101*a* transmits a Delay_resp packet (a delay-detection response packet) to each of the image capturing apparatuses 101*b* to 101*d* via the network processor 210. The Delay_resp packet includes information about the reception time at which the image capturing apparatus 101*a* received the Delay_req packet. The CPU 207 of each of the image capturing apparatuses 101*b* to 101*d* receives the Delay_resp packet from the image capturing apparatus 101*a* via the network processor 210. Then, the CPU207 of each of the image capturing apparatuses 101*b* to 101*d* calculates the delay time in the communication path in the direction from the secondary apparatus to the primary apparatus on the basis on the difference between the transmission time of the Delay_req packet and the reception time of the Delay_req packet.

By periodically transmitting and receiving packets as described above, the image capturing apparatuses 101*b* to 101*d* as the secondary apparatuses can periodically correct the times so as to match the time of the image capturing apparatus 101*a* as the primary apparatus. This enables periodic time synchronization.

Figure 7:
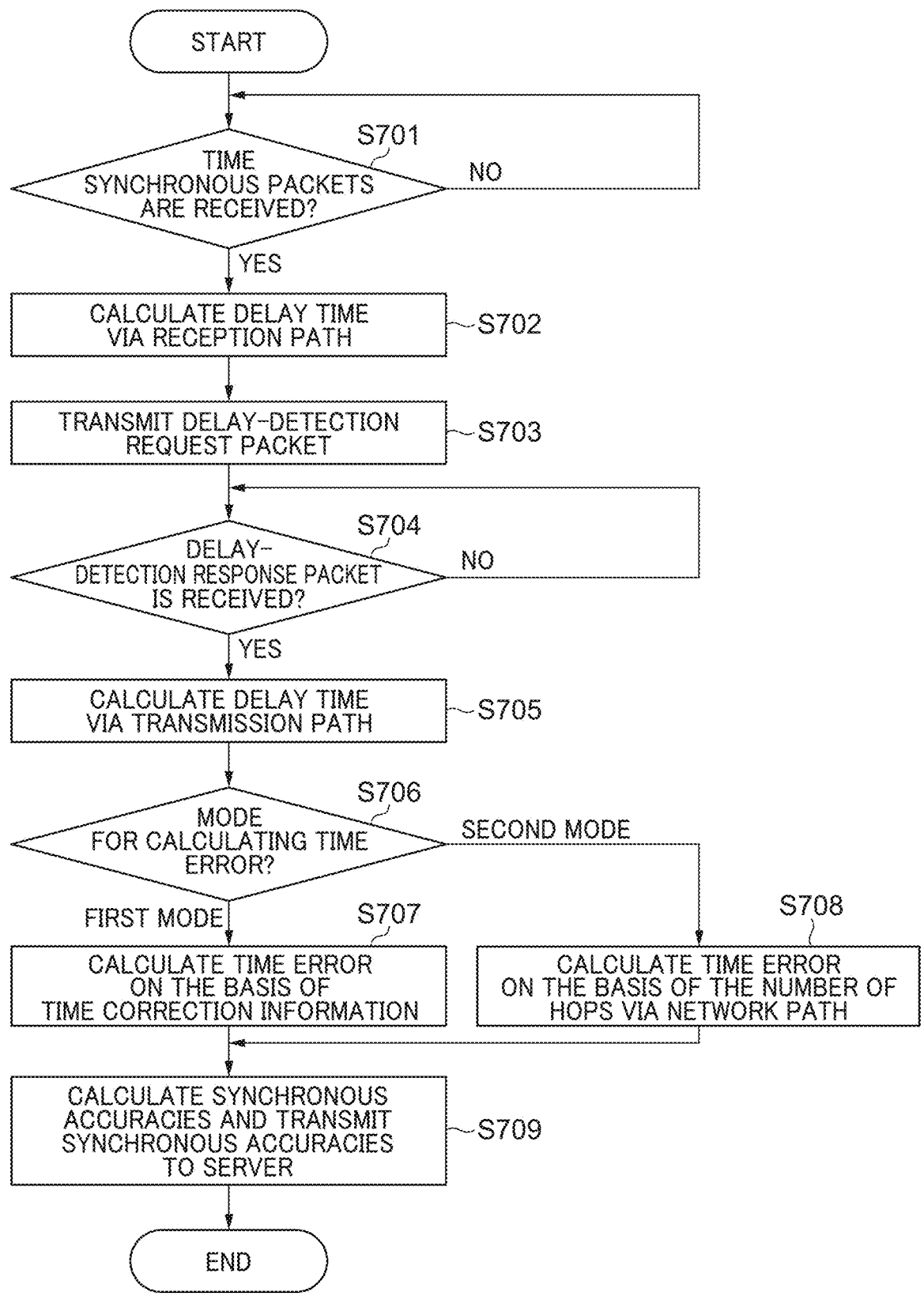
FIG. 7 is a flowchart showing a synchronous accuracy calculation process in a step S305 (subroutine) of the flowchart shown in FIG. 3.

FIG. 7 is a flowchart showing the synchronous accuracy calculation process in the step S305 (subroutine) of the flowchart shown in FIG. 3. As shown in FIG. 7, in a step S701, the CPU 207 of each of the image capturing apparatuses 101*b* to 101*d* as the secondary apparatuses determines whether the time synchronous packets are received from the image capturing apparatus 101*a* as the primary apparatus via the network processor 210. The time synchronous packets include two packets that are the Sync packet (see the step S601 in FIG. 6) and the Follow-Up packet (see the step S602 in FIG. 6).

As a result of the determination in the step S701, when the CPU 207 of each of the image capturing apparatuses 101*b* to 101*d* determines that the time synchronous packets are received, the process proceeds to a step S702. In the meantime, as a result of the determination in the step S701, when the CPU207 of each of the image capturing apparatuses 101*b* to 101*d* determines that the time synchronous packets are not received, the process waits in the step S701. In the step S702, the CPU 207 of each of the image capturing apparatuses 101*b* to 101*d* calculates the delay time via the reception path on the basis of the Sync packet and the Follow Up packet received in the step S701. The delay time is calculated by comparing the reception time at which the Sync packet is received with the transmission time included in the Follow Up packet, and is the difference from the time of the image capturing apparatus 101*a*.

In a step S703, the CPU207 of each of the image capturing apparatuses 101*b* to 101*d* transmits the Delay_req packet (delay-detection request packet, see the step S603 in FIG. 6) to the image capturing apparatus 101*a* via the network processor 210. The Delay_req packet includes time information of each of the image capturing apparatuses 101*b* to 101*d* at the time of transmission of the packet concerned.

In a step S704, the CPU 207 of each of the image capturing apparatuses 101*b* to 101*d* determines whether the Delay_resp packet (delay-detection response packet, see the step S604 in FIG. 6) is received from the image capturing apparatus 101*a* via the network processor 210. As a result of the determination in the step S704, when the CPU 207 of each of the image capturing apparatuses 101*b* to 101*d* determines that the Delay_resp packet is received, the process proceeds to a step S705. In the meantime, as a result of the determination in the step S704, when the CPU 207 of each of the image capturing apparatuses 101*b* to 101*d* determines that the Delay_resp packet is not received, the process waits in the step S704.

In the step S705, the CPU 207 of each of the image capturing apparatuses 101*b* to 101*d* calculates the delay time via the transmission path on the basis of the transmission time of the Delay_req packet in the step S703 and the Delay_resp packet received in the step S704.

Next, the CPU 207 of each of the image capturing apparatuses 101*b* to 101*d* calculates a total delay time of the transmission and reception paths based on the delay time via the transmission path and the delay time via the reception path calculated in the step S702. Then, the CPU 207 of each of the image capturing apparatuses 101b to 101d correct the time of each of the image capturing apparatuses 101b to 101d so as to match the time of image capturing apparatus 101a on the basis of the calculation result value and records it. The CPU 207 of the each of the image capturing apparatuses 101b to 101d counts the number of hops via the network path of the time synchronous packet.

In a step S706, the CPU 207 of each of the image capturing apparatuses 101b to 101d determines whether the mode for calculating a time error that is a difference from the time of the image capturing apparatus 101a is a first mode or a second mode. The first mode is a mode in which the time error is calculated on the basis of the correction amount in performing the time correction. The second mode is a mode in which the time error is calculated on the basis of the number of hops via the network path of transmission and reception of the time synchronous packet.

As a result of the determination in the step S706, when the CPU 207 of each of the image capturing apparatuses 101b to 101d determines that the mode is the first mode, the process proceeds to a step S707. In the meantime, as a result of the determination in the step S706, when the CPU 207 of each of the image capturing apparatuses 101b to 101d determines that the mode is the second mode, the process proceeds to a step S708.

In the step S707, the CPU 207 of each of the image capturing apparatuses 101b to 101d calculates the time error, which is a difference from the time of the image capturing apparatus 101a, on the basis of history of time correction information obtained by receiving the time synchronous packets. Specifically, the CPU 207 of each of the image capturing apparatuses 101b to 101d calculates the time error using the maximum value of correction amount for time adjustment with the image capturing apparatus 101a. This enables calculation of a quantitative value indicating the degree of the time error between the time of the secondary apparatus and the time of the primary apparatus (the image capturing apparatus 101a). Then, the server 103 decides a neural network to be used for the image correction on the basis of the calculated value. After the execution of the step S707, the process proceeds to a step S709.

In the step S708, the CPU 207 of each of the image capturing apparatuses 101b to 101d calculates the time error on the basis of the number of hops via the network path obtained by the reception of the time synchronous packet. Thus, the delay time of the network path can be calculated. Then, the neural network can be decided on the basis of the calculated value. After the execution of the step S708, the process proceeds to the step S709.

In the step S709, the CPU 207 of the image capturing apparatus 101a calculates the synchronous accuracies on the basis of the time errors calculated in the step S707 or S708. The CPU 207 of the image capturing apparatus 101a then transmits the synchronous accuracies to the server 103 via the network processor 210. As a result, as described above, the server 103 can decide the neural network 410 on the basis of the synchronous accuracies. The steps S701 to S709 are preferably repeated. As described above, in this embodiment, the CPU 207 of the image capturing apparatus 101a can calculate the synchronous accuracies on the basis of the communication speeds at the time when the image capturing apparatuses 101a to 101d communicate with each other.

Hereinafter, a second embodiment will be described with reference to FIGS. 8, 9A, and 9B. The description will be made focusing on differences from the above-described embodiment, and the description of the same matters will be omitted. In this embodiment, a configuration in which three dimensional synthesis is performed according to the number of image capturing apparatuses of which the synchronous accuracies are out of an allowable range will be described.

FIG. 8 is a flowchart showing a series of processes until a server of an image capturing system according to the second embodiment synthesizes images from respective image capturing apparatuses. As shown in FIG. 8, in a step S801, the CPU 202 of the server 103 determines, as with the step S401, whether the server communication unit 205 receives the synchronous accuracies transmitted in the step S305.

As a result of the determination in the step S801, when the CPU 202 determines that the synchronous accuracies are received, the process proceeds to a step S802. In the meantime, as a result of the determination in the step S801, when the CPU 202 determines that the synchronous accuracies are not received, the process waits in the step S801.

In the step S802, the CPU 202 determines whether the synchronous accuracies included in the synchronous accuracies received in the step S801 fall within an allowable range. In this way, in this embodiment, the CPU 202 has a function of a determination unit that determines whether the synchronous accuracies fall within the allowable range.

When the synchronous accuracies fall within the allowable range, a neural network with less the number of layers and/or total number of nodes and a shorter processing time is decided as the neural network 410 to be used. In contrast, when the synchronous accuracies do not fall within the allowable range, a neural network with more the number of layers and/or total number of nodes and a longer processing time is decided as the neural network 410 to be used.

Hereinafter, a neural network with less the number of layers and/or total number of nodes is referred to as a "neural network A" and a neural network with more the number of layers and/or total number of nodes is referred to as a "neural network B". Then, as a result of the determination in the step S802, when the CPU 202 determines that the synchronous accuracies fall within the allowable range, the process proceeds to a step S803. In the meantime, as a result of the determination in the step S802, when the CPU 202 determines that the synchronous accuracies do not fall within the allowable range, the process proceeds to a step S804.

In the step S803, the CPU 202 decides the model with less the number of layers and/or total number of nodes (the neural network A) as the neural network 410 used in a step S810.

In the step S804, the CPU 202 obtains the number of image capturing apparatuses of which the synchronous accuracies are determined to be out of the allowable range in the step S802. And then, the process proceeds to a step S805.

In the step S805, the CPU 202 determines whether the number of image capturing apparatuses obtained in the step S804 is equal to or less than a threshold N. A method of deciding the threshold N will be described. As described above, the neural network 410 may be the neural network A or the neural network B. The difference in a computation amount between the neural network A and the neural network B is large.

For example, when the time correction process corresponding to a time deviation amount is applied to each of the images sent from the image capturing apparatuses on the basis of the vector information, and then the blur of the three dimensional image obtained by synthesizing these images is corrected using the neural network A, the calculation time may be short. Here, the calculation time by the neural network A is X1, and the calculation time by the neural network B is X2. In addition, the time required for the time correction process corresponding to the time deviation amount for one image is X3. The calculation time X1, the calculation time X2, the required time X3, and the threshold N satisfy the following expression (1). The threshold value N can be derived from the expression (1).

$$X1 + X3*N < X2 \qquad (1)$$

Then, as a result of the determination in the step S805, when the CPU 202 determines that the number of image capturing apparatuses is equal to or less than the threshold N, the process proceeds to a step S806. In the meantime, as a result of the determination in the step S805, when the CPU 202 determines that the number of image capturing apparatuses is more than the threshold N, the process proceeds to a step S807.

In the step S806, the CPU 202 decides to apply the time correction process corresponding to the time deviation amount to an image obtained from an image capturing apparatus of which a synchronous accuracy is determined not to fall within the allowable range in the step S802, and the process proceeds to the step S803. The time correction process is enabled by generating a pseudo image corresponding to an interframe image on the basis of vector information. This process may employ another neural network.

In a step S807, the CPU 202 decides to use the model with more the number of layers and/or total number of nodes (the neural network B) as the neural network 410, and the process proceeds to a step S808.

In the step S808, the CPU 202 determines whether the server communication unit 205 has received the captured images from the image capturing apparatuses 101a to 101d transmitted in the step S308. As a result of the determination in the step S808, when the CPU 202 determines that all the captured images have been received, the process proceeds to a step S809. In the meantime, as a result of the determination in the step S808, when the CPU 202 determines that not all the captured images have been received, the process waits in the step S808.

In the step S809, the CPU 202 executes the time correction process and proceeds with the process to a step S810. The process in the step S809 is executed on an image from an image capturing apparatus of which a synchronous accuracy is decided not to fall within the allowable range in the step S806 in accordance with the time deviation amount.

In the step S810, the GPU 204 applies the image process to all the captured images received in the step S803 using the neural network 410 decided in the step S807 or S808. That is, all the captured images are synthesized to generate a three dimensional image. Thus, the three dimensional image in which all the captured images are synthesized is generated. The three dimensional image is an image in which the blur is corrected. The steps S801 to S810 are preferably repeated.

Figure 9A:
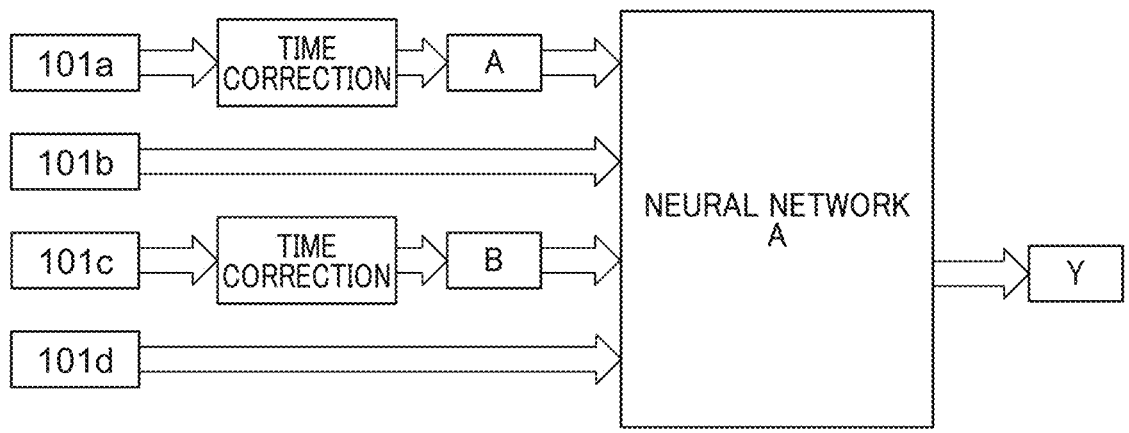
FIG. 9A and FIG. 9B are views for describing how neural network is selected depending on the number of image capturing apparatuses with a relatively low synchronous accuracy.
Figure 9B:
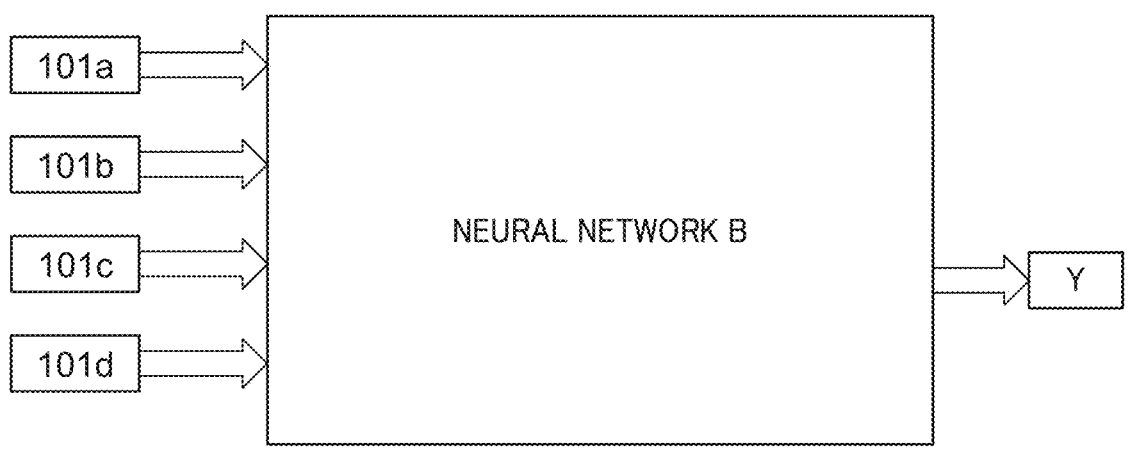

FIG. 9A and FIG. 9B are views for describing how neural network is selected depending on the number of image capturing apparatuses with relatively large synchronous accuracy errors. Hereinafter, the threshold N of the number of image capturing apparatuses determined that the synchronous accuracies do not fall within the allowable range shall be "3". FIG. 9A is a view showing a case where the actual number of image capturing apparatuses determined that the synchronous accuracies do not fall within the allowable range is "2". In the case shown in FIG. 9A, the actual number of image capturing apparatuses is smaller than the threshold N. FIG. 9B is a view showing a case where the actual number of image capturing apparatuses determined that the synchronous accuracies do not fall within the allowable range is "3". In the case shown in FIG. 9B, the actual number of image capturing apparatuses is equal to the threshold N (the actual number ≥N).

In FIG. 9A, the image capturing apparatuses 101a and 101c shall have relatively large synchronous accuracy errors. In this case, the time correction process is applied to the image captured by the image capturing apparatus 101a to create a pseudo image A, and the time correction process is applied to the image captured by the image capturing apparatus 101c to create a pseudo image B. Then, the neural network A is used as the neural network 410 corresponding to the pseudo image A of the image capturing apparatus 101a, the image of the image capturing apparatus 101b, the pseudo image B of the image capturing apparatus 101c, and the image of the image capturing apparatus 101d. Thus, a three dimensional image Y in which image quality deterioration due to a blur is reduced is obtained.

In FIG. 9B, the neural network B is used as the neural network 410 corresponding to the images of the image capturing apparatuses 101a to 101d. Thus, the three dimensional image Y in which image quality deterioration due to a blur is reduced is obtained. As described above, the neural network can be appropriately selected according to the number of image capturing apparatuses having relatively large errors in the synchronous accuracy. This can reduce processing load in the image process. In addition, the three dimensional image is an image in which image quality deterioration due to a blur is reduced.

Hereinafter, a third embodiment will be described with reference to FIG. 10. The description will be made focusing on differences from the above-described embodiments, and the description of the same matters will be omitted. For example, when there is no limitation on a processing time period for creating a three dimensional image in the server 103, it is preferable to use the process described in the first embodiment or the second embodiment. In the meantime, for example, when a user wants to view a three dimensional image in real time, it is preferable that the processing time period for creating a three dimensional image is limited and the three dimensional image is created in the processing time period.

Here, as the number of the image capturing apparatuses increases, the neural network B tends to be selected as the neural network 410. However, the neural network B may be difficult to use according to the number of the image capturing apparatuses. Therefore, a configuration in which the neural network 410 is selected according to a processing time period allowable to the CPU 202 of the server 103 will be described in this embodiment.

Figure 10:
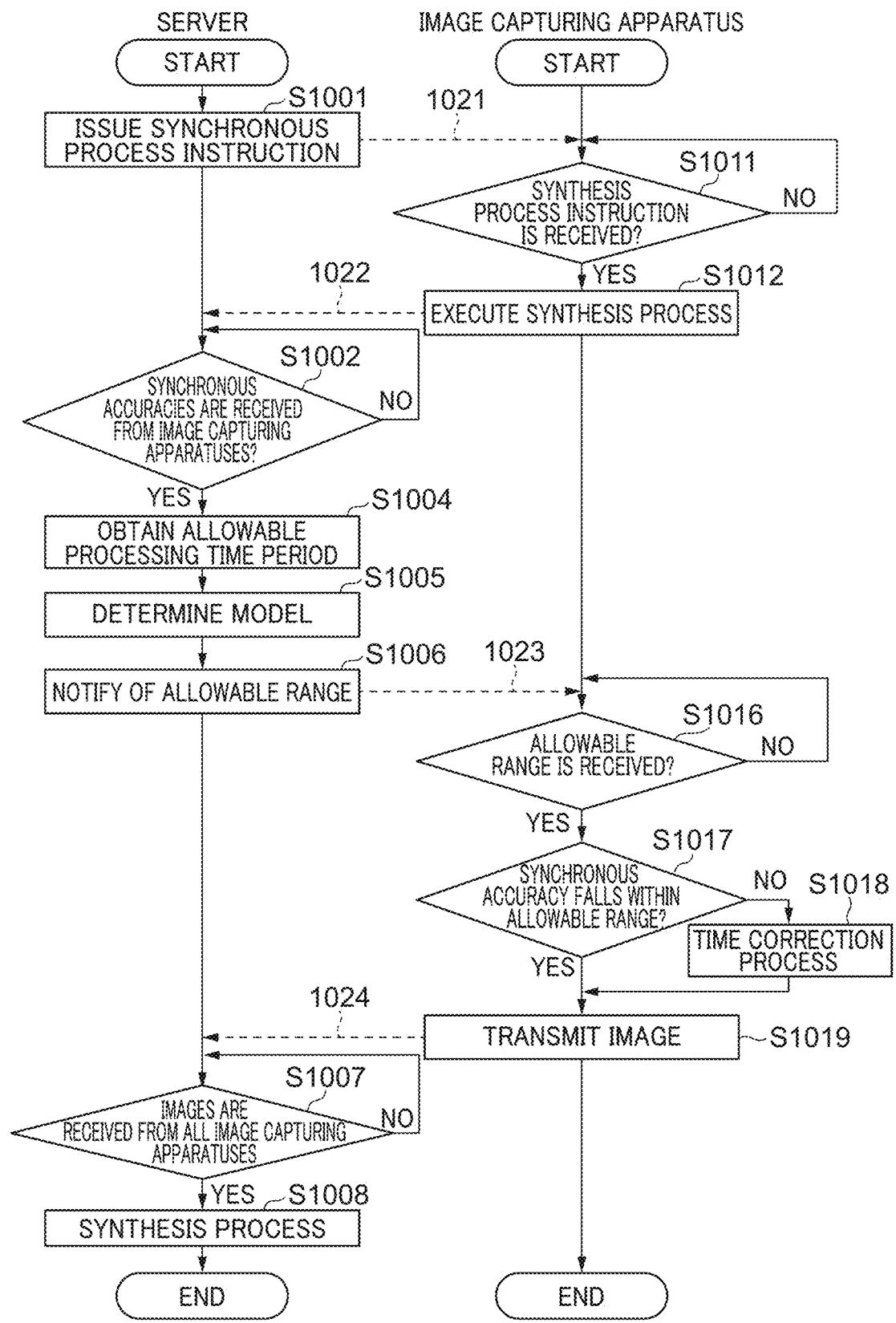
FIG. 10 is a flowchart showing a series of processes until the server of the image capturing system according to a third embodiment synthesizes images from the respective image capturing apparatuses.

FIG. 10 is a flowchart showing a series of processes until the server of the image capturing system according to the third embodiment synthesizes images from the respective image capturing apparatuses. First, the process in the server 103 will be described. As shown in FIG. 10, the CPU 202 of the server 103 issues a synchronous process instruction 1021 to the image capturing apparatuses 101a to 101d in a step S1001, and the process proceeds to a step S1002.

In the step S1002, the CPU 202 determines whether the server communication unit 205 receives the synchronous accuracies 1022 transmitted in the step S305. As a result of the determination in the step S1002, when the CPU 202 determines that the synchronous accuracies 1022 are received, the process proceeds to a step S1004. In the meantime, as a result of the determination in the step S1002, when the CPU 202 determines that the synchronous accuracies 1022 are not received, the process waits in the step S1002.

In the step S1004, the CPU 202 obtains an allowable processing time period that is allowed to be spent in the creation of a three dimensional image (image synthesis), and the process proceeds to a step S1005. The allowable processing time period may be input by the user or may be obtained from the ROM 215 that stores it in advance.

In the step S1005, the CPU 202 decides the neural network 410 (a learned model) to be used in a step S1008 on the basis of the total number of the image capturing apparatuses in the image capturing system 1000 and the allowable processing time period obtained in the step S1004. A plurality of models of neural networks are stored in the ROM 215 in advance, and one neural network suitable for the process within the allowable processing time period is selected from among these. After the execution of the step S1005, the process proceeds to a step S1006.

In the step S1006, the CPU 202 notifies the image capturing apparatuses 101a to 101d of an allowable range 1023 for the synchronous accuracy corresponding to the neural network decided in the step S1005, and the process proceeds to a step S1007.

In the step S1007, the CPU 202 determines whether the server communication unit 205 has received the captured images 1024 from the image capturing apparatuses 101a to 101d. As a result of the determination in the step S1007, when the CPU 202 determined that all the captured images have been received, the process proceeds to the step S1008. In the meantime, as a result of the determination in the step S1007, the CPU 202 determines that not all the captured images have been received, the process waits in the step S1007.

In the step S1008, the GPU 204 synthesizes the all the captured images received in the step S1007 to generate a three dimensional image using the neural network 410 decided in the step S1005. As a result, the three dimensional image becomes an image in which the blur is corrected.

Next, the process in each of the image capturing apparatuses 101a to 101d will be described. As shown in FIG. 10, in a step S1011, the CPU 207 of each of the image capturing apparatuses 101a to 101d determines whether the synchronous process instruction 1021 issued in the step S1001 is received. As a result of the determination in the step S1011, when the CPU 207 determines that the synchronous process instruction 1021 is received, the process proceeds to a step S1012. In the meantime, as a result of the determination in the step S1011, when the CPU 207 determines that the synchronous process instruction 1021 is not received, the process waits in the step S1011.

In the step S1012, the CPU 207 performs the synchronous process and the process proceeds to a step S1016. Since the synchronous process has been described with reference to FIG. 6, the description thereof is omitted.

In the step S1016, the CPU 207 determines whether the allowable range 1023 notified in the step S1006 is received. As a result of the determination in the step S1016, when the CPU 207 determines that the allowable range 1023 is received, the process proceeds to a step S1017. In the meantime, as a result of the determination in the step S1016, when the CPU 207 determines that the allowable range 1023 is not received, the process waits in the step S1016.

In the step S1017, the CPU 207 determines whether the synchronous accuracy of the synchronized captured image falls within the allowable range 1023 received in the step S1016. As a result of the determination in the step S1017, when the CPU 207 determines that the synchronous accuracy falls within the allowable range 1023, the process proceeds to a step S1019. In the meantime, as a result of the determination in the step S1017, when the CPU 207 determines that the synchronous accuracy does not fall within the allowable range 1023, the process proceeds to a step S1018.

In the step S1018, a CPU 207 of an image capturing apparatus of which the synchronous accuracy is out of the allowable range applies the time correction process corresponding to the time deviation amount to a captured image. After the execution of the step S1018, the process proceeds to the step S1019.

In the step S1019, the CPU 207 transmits the captured image 1024 from the network processor 210 to the server 103.

The time correction process may be executed in the image capturing apparatuses 101a to 101d or may not be executed in some image capturing apparatuses. Further, the CPU 207 also functions as a switching unit that switches the image capturing apparatus set to the primary apparatus to the secondary apparatus and switches the image capturing apparatus set to the secondary apparatus to the primary apparatus. In this case, the primary apparatus can be selected from image capturing apparatuses that do not execute the time correction process and can be switched thereto. This allows the omission of the time correction process in the primary apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-100020, filed Jun. 19, 2023, which is hereby incorporated by reference herein in its entirety.

What is claimed is:

1. An image capturing system comprising:
   image capturing apparatuses capable of image capturing and communicable mutually;
   a time synchronous unit configured to synchronize times of the image capturing apparatuses;
   a controller configured to control image capturing timings of the image capturing apparatuses based on the times synchronized by the time synchronous unit;
   an image processing unit configured to apply an image process to images captured by the image capturing apparatuses at the image capturing timings controlled by the controller with using a learned model; and
   a decision unit configured to decide the learned model used in the image processing unit based on synchronous accuracies of times synchronized by the time synchronous unit.

2. The image capturing system according to claim 1, wherein the image processing unit applies a synthesis process of synthesizing the images as the image process to generate a three dimensional image.

3. The image capturing system according to claim 2, wherein the image processing unit corrects a blur using the learned model in a case where the blur occurs in the three dimensional image.

4. The image capturing system according to claim 3, wherein the learned model includes a neural network with input, intermediate, and output layers,
   further comprising a storage device storing neural networks that are different from each other in at least one of quantities including a number of layers constituting the input, intermediate, and output layers and a total number of nodes included in all the layers, and
   wherein the decision unit selects one neural network from the neural networks according to a blur correction amount.

5. The image capturing system according to claim 4, wherein the decision unit selects a neural network with more the at least one of quantities as the blur correction amount is larger, and selects a neural network with less the at least one of quantities as the blur correction amount is smaller.

6. The image capturing system according to claim 4, further comprising a determination unit configured to determine whether the synchronous accuracies fall within an allowable range,
   wherein the decision unit selects the neural network with less the at least one of quantities in a case where the determination unit determines that the synchronous accuracies fall within the allowable range.

7. The image capturing system according to claim 6, wherein the determination unit determines whether the number of image capturing apparatuses of which the synchronous accuracies are determined not to fall within the allowable range is equal to or less than a threshold, in a case where at least one of the synchronous accuracies do not fall within the allowable range.

8. The image capturing system according to claim 7, wherein the decision unit selects the neural network with more the at least one of quantities in a case where the determination unit determines that the number of image capturing apparatuses is less than or equal to the threshold, and selects the neural network with less the at least one of quantities in a case where the determination unit determines that the number of image capturing apparatuses is more than the threshold.

9. The image capturing system according to claim 1, wherein the decision unit decides the learned model based on a total number of the image capturing apparatuses and a processing time period that is allowed to be spent in the creation of a three dimensional image.

10. The image capturing system according to claim 1, further comprising a speed detection unit configured to detect a moving speed of a moving object included in the image,
    wherein the decision unit decides the learned model based on a detection result at the speed detection unit.

11. The image capturing system according to claim 1, further comprising an accuracy detection unit configured to detect the synchronous accuracies.

12. The image capturing system according to claim 11, wherein the accuracy detection unit detects the synchronous accuracies based on time errors obtained in synchronizing the times of the image capturing apparatuses mutually.

13. The image capturing system according to claim 11, wherein the accuracy detection unit detects the synchronous accuracies based on a communication speed at a time when the image capturing apparatuses communicate with each other.

14. The image capturing system according to claim 1, wherein the time synchronous unit synchronizes the times of the image capturing apparatuses by setting one of the image capturing apparatuses as a primary apparatus, setting the remaining image capturing apparatuses as secondary apparatuses, and adjusting the times of the secondary apparatuses to the time of the primary apparatus.

15. The image capturing system according to claim 14, further comprising a set unit configured to set one of the image capturing apparatuses as the primary apparatus and set the remaining image capturing apparatuses as the secondary apparatuses.

16. The image capturing system according to claim 15, further comprising a switching unit configured to switch the image capturing apparatus set to the primary apparatus to the secondary apparatus, and switches the image capturing apparatus set to the secondary apparatus to the primary apparatus.

17. A control method for an image capturing system including image capturing apparatuses capable of image capturing and communicable mutually, the control method comprising:
    a time synchronous step of synchronizing times of the image capturing apparatuses;
    a control step of controlling image capturing timings of the image capturing apparatuses based on the times synchronized in the time synchronous step;
    an image processing step of applying an image process to images captured by the image capturing apparatuses at the image capturing timings controlled in the control step with using a learned model; and
    a decision step of deciding the learned model used in the image processing step based on synchronous accuracies of times synchronized in the time synchronous step.

18. A non-transitory computer-readable storage medium storing a control program causing a computer to execute a control method for an image capturing system including image capturing apparatuses capable of image capturing and communicable mutually, the control method comprising:

a time synchronous step of synchronizing times of the image capturing apparatuses;

a control step of controlling image capturing timings of the image capturing apparatuses based on the times synchronized in the time synchronous step;

an image processing step of applying an image process to images captured by the image capturing apparatuses at the image capturing timings controlled in the control step with using a learned model; and a decision step of deciding the learned model used in the image processing step based on synchronous accuracies of times synchronized in the time synchronous step.

* * * * *